(No Model.)
R. S. PEABODY.
BENCH VISE.
No. 528,968.　　　　　　　　Patented Nov. 13, 1894.
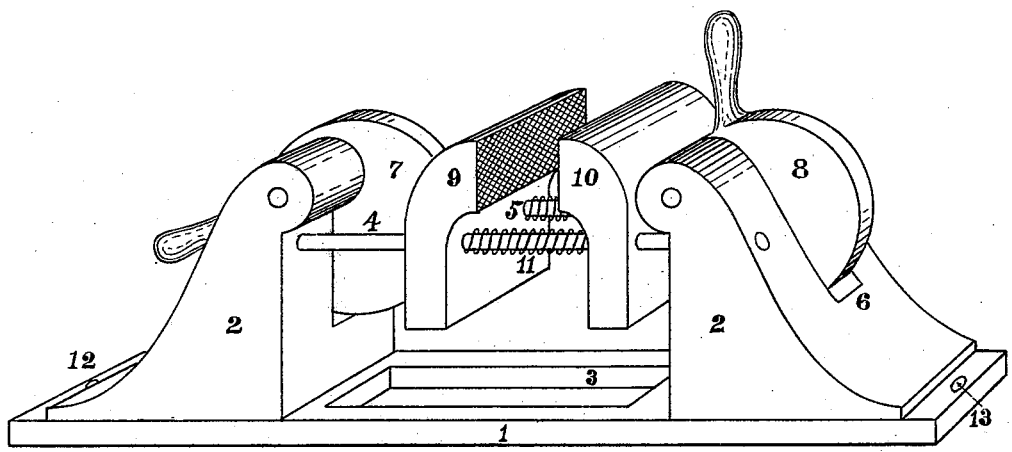
WITNESSES:　　　　　　　　　　　　　　　INVENTOR
W. Hermann Apgar　　　　　　　　　　Robert Singleton Peabody
K. M. Gilligan.　　　　　　　　　BY
　　　　　　　　　　　　　　　　Augustus B. Stoughton
　　　　　　　　　　　　　　　　　　　ATTORNEY

UNITED STATES PATENT OFFICE.

ROBERT SINGLETON PEABODY, OF PHILADELPHIA, PENNSYLVANIA.

BENCH-VISE.

SPECIFICATION forming part of Letters Patent No. 528,968, dated November 13, 1894.

Application filed May 18, 1894. Serial No. 511,732. (No model.)

*To all whom it may concern:*

Be it known that I, ROBERT SINGLETON PEABODY, a citizen of the United States, residing at the city of Philadelphia, in the county of Philadelphia and State of Pennsylvania, have invented certain new and useful Improvements in Bench-Vises, of which the following is a specification.

The principal object of my present invention is to provide a compact, convenient, efficient, simple and comparatively inexpensive vise for holding work of various kinds including long rods or similar articles and to this end my invention stated in general terms, consists of a bench vise comprising a base provided with posts carrying rods or guides, jaws sliding on and carried by said rods or guides, and eccentrics for operating said jaws as is hereinafter fully described and particularly referred to in the claims.

The nature, characteristic features and scope of my invention will be more fully understood from the following description taken in connection with the accompanying drawing forming part hereof and in which is illustrated a perspective view of a bench vise embodying features of my invention.

In the drawing, 1, is a base plate provided with posts or projections 2, and with a central opening 3, for purposes to be hereinafter set forth.

4 and 5, are parallel rods or guides carried by and secured to the posts or projections 2, and the latter are recessed or bifurcated as at 6, for the accommodation of pivotally supported eccentrics 7 and 8.

9 and 10, are clamping jaws provided with apertures through which the rods or guides 4 and 5, pass, so that these jaws are carried by and are free to slide upon the rods or guides.

11, are spiral springs coiled in the present instance, around the rods or guides and adapted to normally separate the jaws 9 and 10.

The mode of operation of the hereinabove described device is as follows: One or both of the jaws 9 and 10, may be opened as required for the reception of work by turning its corresponding eccentric into the position indicated at the right-hand side of the drawing, it being understood that the jaws are opened by reason of the resiliency of the springs 11. The work may then be clamped by the simple operation of turning the eccentric or eccentrics through the intervention of their operating handle or handles into the position indicated at the left-hand side of the drawing, with the result that the jaws are shifted toward each other and retained in such position. It may be remarked that inasmuch as the eccentrics and the guides or rods operate upon the jaws substantially in alignment with their working faces, it follows that the device possesses considerable mechanical strength and is well adapted to firmly clamp the work. Moreover the rods or guides 4 and 5, are parallel with each other and penetrate apertures in each of the jaws, whereby parallelism of the working faces of the jaws is insured. The bed-plate may be secured to a bench, table or other object at its respective ends by means of bolts or screws 12 and 13.

Without further illustration, it is obvious that one of the bolts or screws, for example, the screw 12, may be omitted, and in such case the vise may be turned about the other bolt or screw as a center, in such manner that the opening 3, lies beyond the edge of the bench or table, or is brought into alignment with an opening cut or otherwise formed therein. In this position of the vise, comparatively long rods may be inserted through the opening 3, and in such manner that they extend beneath the bench or table, whereby the upper ends of the rods may be clamped by the jaws and filed or otherwise operated upon in any well understood manner.

Having thus described the nature and objects of my invention, what I claim as new, and desire to secure by Letters Patent, is—

1. A bench vise comprising, a base having a central opening and provided at its ends with rigid posts, rods or guides carried clear of the base and at the sides of said opening and secured at their respective ends to said posts, jaws carried clear of the base and provided with openings through which said rods or guides pass, and eccentrics journaled in recesses in the posts and operating respectively upon said jaws, substantially as described.

2. A bench-vise comprising a base provided with posts, rods or guides carried by said posts, jaws provided with openings through which said rods or guides pass, springs encircling said rods or guides and tending to separate said jaws, and eccentrics mounted on said posts and operating respectively upon said jaws, substantially as described.

3. A bench-vise comprising a base recessed or cut out at its center and provided with posts, rods carried by said posts, spring actuated jaws sliding on and carried by said rods, and eccentrics for closing said jaws, substantially as described.

In testimony whereof I have hereunto signed my name.

ROBERT SINGLETON PEABODY.

In presence of—
   ANDREW B. CAMPBELL,
   A. B. STOUGHTON.